(12) United States Patent
Wonwoo

(10) Patent No.: US 11,353,717 B2
(45) Date of Patent: Jun. 7, 2022

(54) RIMLESS GLASSES

(71) Applicant: Seo Wonwoo, Gyeongsan-si (KR)

(72) Inventor: Seo Wonwoo, Gyeongsan-si (KR)

( * ) Notice: Subject to any disclaimer, the term of this patent is extended or adjusted under 35 U.S.C. 154(b) by 183 days.

(21) Appl. No.: 16/658,653

(22) Filed: Oct. 21, 2019

(65) Prior Publication Data

US 2020/0124872 A1 Apr. 23, 2020

(51) Int. Cl.
*G02C 1/02* (2006.01)

(52) U.S. Cl.
CPC ..................... *G02C 1/02* (2013.01)

(58) Field of Classification Search
CPC .......... G02C 5/14; G02C 5/143; G02C 11/00; G02C 11/02; G02C 5/146; G02C 11/10; G02C 2200/02; G02C 2200/08; G02C 5/008; G02C 5/2209; G02C 2200/04; G02C 5/10; G02C 5/22; G02C 3/003; G02C 5/00; G02C 5/001; G02C 5/16; G02C 5/20; G02C 1/02; G02C 3/006
See application file for complete search history.

(56) References Cited

U.S. PATENT DOCUMENTS

| 2,091,272 | A | | 8/1937 | Cozzens | |
|---|---|---|---|---|---|
| 2,173,016 | A | | 9/1939 | Holmes | |
| 2,359,666 | A | | 10/1944 | Nerney | |
| 5,859,684 | A | * | 1/1999 | Rittmann | G02C 5/143 |
| | | | | | 351/111 |
| 6,719,425 | B2 | * | 4/2004 | Conner | G02C 1/02 |
| | | | | | 16/228 |
| 7,832,855 | B2 | * | 11/2010 | Stovall | G02C 1/02 |
| | | | | | 351/156 |
| 2007/0126980 | A1 | * | 6/2007 | Carlon | G02C 5/2209 |
| | | | | | 351/111 |
| 2008/0218683 | A1 | * | 9/2008 | Lam | C08L 67/02 |
| | | | | | 351/117 |

FOREIGN PATENT DOCUMENTS

| JP | H1124004 A | 1/1999 |
|---|---|---|
| JP | 2002169125 A | 6/2002 |
| KR | 200194187 Y1 | 9/2000 |
| KR | 20130044476 A | 5/2013 |

OTHER PUBLICATIONS

EP Search Report.

* cited by examiner

*Primary Examiner* — William R Alexander
*Assistant Examiner* — Sharrief I Broome
(74) *Attorney, Agent, or Firm* — Welsh Flaxman & Gitler LLC

(57) ABSTRACT

The present invention discloses novel rimless glasses which include a left temple, a left end piece, a left lens, a nose mid-bridge, a right lens, a right end piece and a right temple. A first lens fixing device is disposed between the left end piece and a left end of the left lens. A second lens fixing device is disposed between a right end of the left lens and a left end of the nose mid-bridge. A third lens fixing device is disposed between a right end of the nose mid-bridge and a left end of the right lens. A fourth lens fixing device is disposed between a right end of the right lens and the right end piece. The rimless glasses have a reasonable simple structure design, a reliable connection, not easy looseness, ease of assembly and disassembly, convenient maintenance, and achieves a reinforcement effect on the lenses.

7 Claims, 5 Drawing Sheets

RIMLESS GLASSES

BACKGROUND OF THE INVENTION

The present invention relates to the technical field of glasses, and more particularly to rimless glasses.

Rimless glasses are a type of glasses, which are characterized in that no frame is provided to support the peripheries of lenses of the glasses. The lenses are directly supported by temples on both sides, and therefore, the glasses are called rimless glasses. The rimless glasses are more fashionable, rich in color, and comfortable to wear, and greatly relieve the pressure on the nose bridge and eyes. In addition, without the constraint caused by a glasses frame, a wearer can have a wider visual field, and therefore, rimless glasses are popular with young people who wear glasses.

Traditional rimless glasses are fixed by screws and nuts, and thus are relatively heavy. In addition, after the rimless glasses are worn for a period of time, screws for mounting and fastening at the joints of the lenses with the temples and the nose mid-bridge loosen, and the temples, the lenses and the nose mid-bridge will swing after the screws are loosened. Furthermore, under the action of external force such as rotation or torsion, the external force will directly act on the lenses, so that damage and breakage of the lenses can be easily caused. After the rimless glasses are used for a period of time, the position between the temples will be relatively expanded, resulting in that the glasses are not suitable for wearing and the pupil positions on the glasses are changed, influencing the degrees of glasses.

SUMMARY OF THE INVENTION

To overcome the shortcomings of the prior designs, an objective of the present invention is to provide novel rimless glasses which have a reasonable structure design, a simple structure, a reliable connection, not easy looseness, ease of assembly and disassembly, convenient maintenance, and achieves a reinforcement effect on the lenses.

To achieve the aforementioned objective, the present invention provides rimless glasses including a left temple, a left end piece, a left lens, a nose mid-bridge, a right lens, a right end piece, and a right temple. The left temple is connected to a left end of the left lens through the left end piece. The left lens is connected to the right lens through the nose mid-bridge. A right end of the right lens is connected to the right temple through the right end piece. A first lens fixing device is disposed between the left end piece and the left end of the left lens. A second lens fixing device is disposed between a right end of the left lens and a left end of the nose mid-bridge. A third lens fixing device is disposed between a right end of the nose mid-bridge and a left end of the right lens. A fourth lens fixing device is disposed between the right end of the right lens and the right end piece; the first lens fixing device includes a lens positioning frame. The lens slot is disposed at one end of the lens positioning frame. A positioning screw tube is disposed through the slotted end of the lens positioning frame. A first fixing screw is in threaded connection with a front end of the positioning screw tube, and a second fixing screw is disposed at a rear end of the positioning screw tube. A first through hole allowing the positioning screw tube to extend therethrough is disposed at the left end of the left lens, and the positioning screw tube is disposed through the first through hole. A first limiting slot is formed at a left edge of the left lens. The lens positioning frame is sleeved on the left end of the left lens and a left end of the lens positioning frame snaps into the first limiting groove. A second through hole is disposed at the left end piece. The head of the first fixing screw extends through the second through hole to be in threaded connection with the front end of the positioning screw tube. When the first fixing screw is tightened, the left end piece and a front end support of the lens positioning frame are forced to press tightly against a front end face of the left lens. A third through hole is disposed at a rear end of the lens positioning frame. The head of the second fixing screw extends through the third through hole to be in threaded connection with the rear end of the positioning screw tube. When the second fixing screw is tightened, a rear end support of the lens positioning frame is connected and fixed to a rear end face of the left lens.

In the context of the present invention "left end of the left lens" refers to the end of the left lens which is closer to the right ear of the user when worn. The term "right end of the left lens" refers to the end of the left lens which is closer to the nose of the user when worn. The term "right end of the right lens" refers to the end of the right lens which is closer to the left ear of the user when worn. The term "left end of the right lens" refers to the end of the right lens which is closer to the nose of the user when worn.

According to the invention, the first lens fixing device is disposed between the left end piece and the left end of the left lens. The second lens fixing device is disposed between the right end of the left lens and the left end of the nose mid-bridge. The third lens fixing device is disposed between the right end of the nose mid-bridge and the left end of the right lens and the fourth lens fixing device is disposed between the right end of the right lens and the right end piece.

The lens positioning frame is sleeved on the lenses and then clamps the lens tightly by locking with screws. The lens positioning frame can disperse the clamping force of the screws, so that the lenses have a large area of thrust surfaces and are reliably fixed and not easy to damage. A good lens positioning effect is achieved and reinforcement of the lenses is realized. Moreover, the novel rimless glasses are reasonable in structure design, simple in structure, reliable in lens connection, not easily loosened, easy to assemble and disassemble, convenient to repair and good in practicability.

Preferably, a positioning groove for mounting the lens positioning frame is disposed at a rear end face of the left end piece and the front end support of the lens positioning frame is mounted in the positioning groove in an embedding manner. With this arrangement, the left end piece is more reasonable in structure arrangement, so that the lens positioning frame is positioned reliably and not easily loosened.

Preferably, the lens positioning frame includes a front support, a middle support and a rear support. A rear end face of the front support is perpendicular to a right end face of the middle support. A front end face of the rear support is perpendicular to the right end face of the middle support. The front support, the middle support and the rear support are integrated. With this arrangement, the lens positioning frame is simple in structure, fixed reliably, and convenient to manufacture.

Preferably, the front support, the middle support and the rear support are made of a metal material, more preferably of a stainless steel material.

Preferably, each of the second lens fixing device, the third lens fixing device and the fourth lens fixing device is the same as the first lens fixing device in structure.

Preferably, the left lens and the right lens are the same in structure.

Preferably, the left end piece and the right end piece are the same in structure.

Preferably, a fourth through hole is disposed at each of the left and right ends of the nose mid-bridge and a second positioning groove is disposed at each of the left and right ends of a rear end face of the nose mid-bridge.

Preferably, the rimless glasses further include at least one decorative element, wherein the decorative element is attached to the left lens by the first lens fixing device.

An advantages of the present invention over the prior designs are: that the structure arrangement of the present invention is more reasonable; the first lens fixing device is disposed between the left end piece and the left end of the left lens; the second lens fixing device is disposed between the right end of the left lens and the left end of the nose mid-bridge; the third lens fixing device is disposed between the right end of the nose mid-bridge and the left end of the right lens; and the fourth lens fixing device is disposed between the right end of the right lens and the right end piece; the lens positioning frame is sleeved on the lenses and then clamps the lens tightly by locking with screws; the lens positioning frame can disperse the clamping force of the screws, so that the lenses have a large area of thrust surfaces, and are reliably fixed and not easy to damage; a good lens positioning effect is achieved, and reinforcement of the lenses is realized; moreover, the novel rimless glasses are reasonable in structure design, simple in structure, reliable in lens connection, not easy to loose, easy to assemble and disassemble, convenient to repair, and good in practicability.

The present invention will be further described in respect to the drawings and specific embodiments.

BRIEF DESCRIPTION OF THE DRAWINGS

FIG. 6c is a schematic enlarged diagram of the encircled part in FIG. 6a.

DETAILED DESCRIPTION OF THE INVENTION

Figure 1:
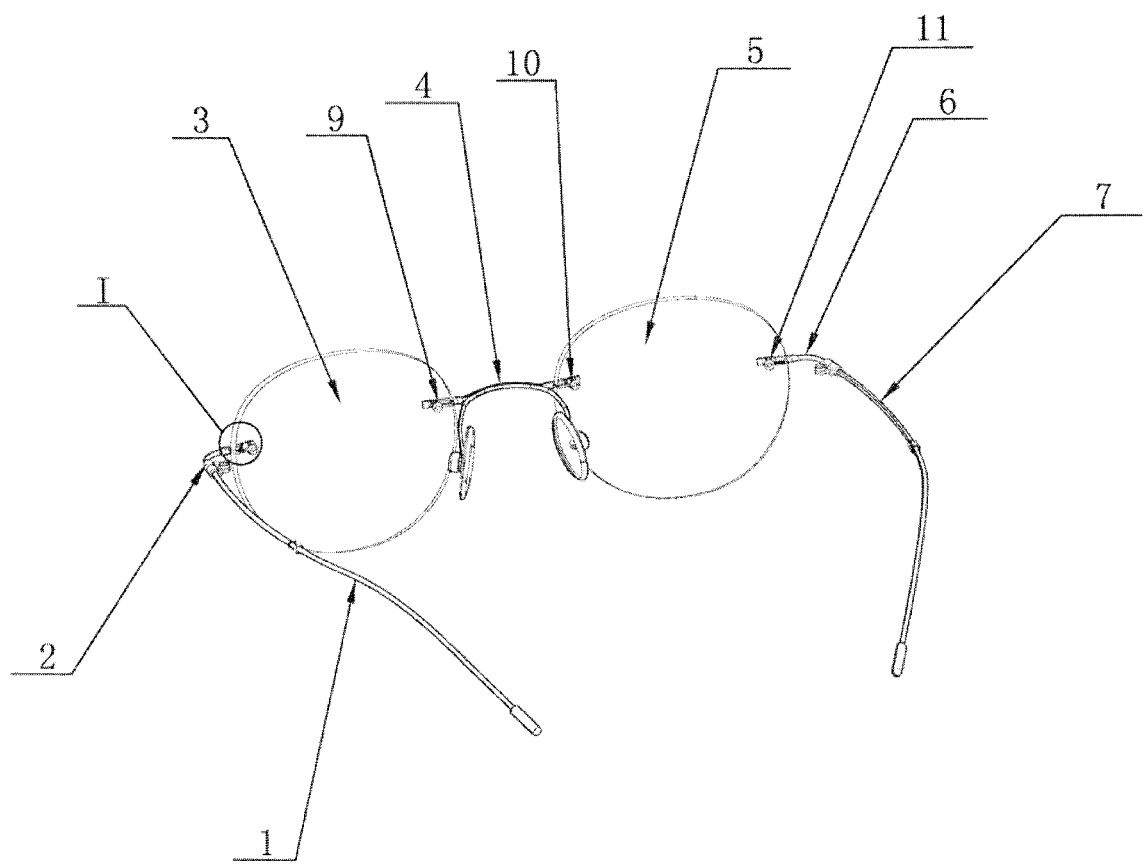
FIG. 1 is a schematic structure diagram according to an embodiment of the present invention.
Figure 2:
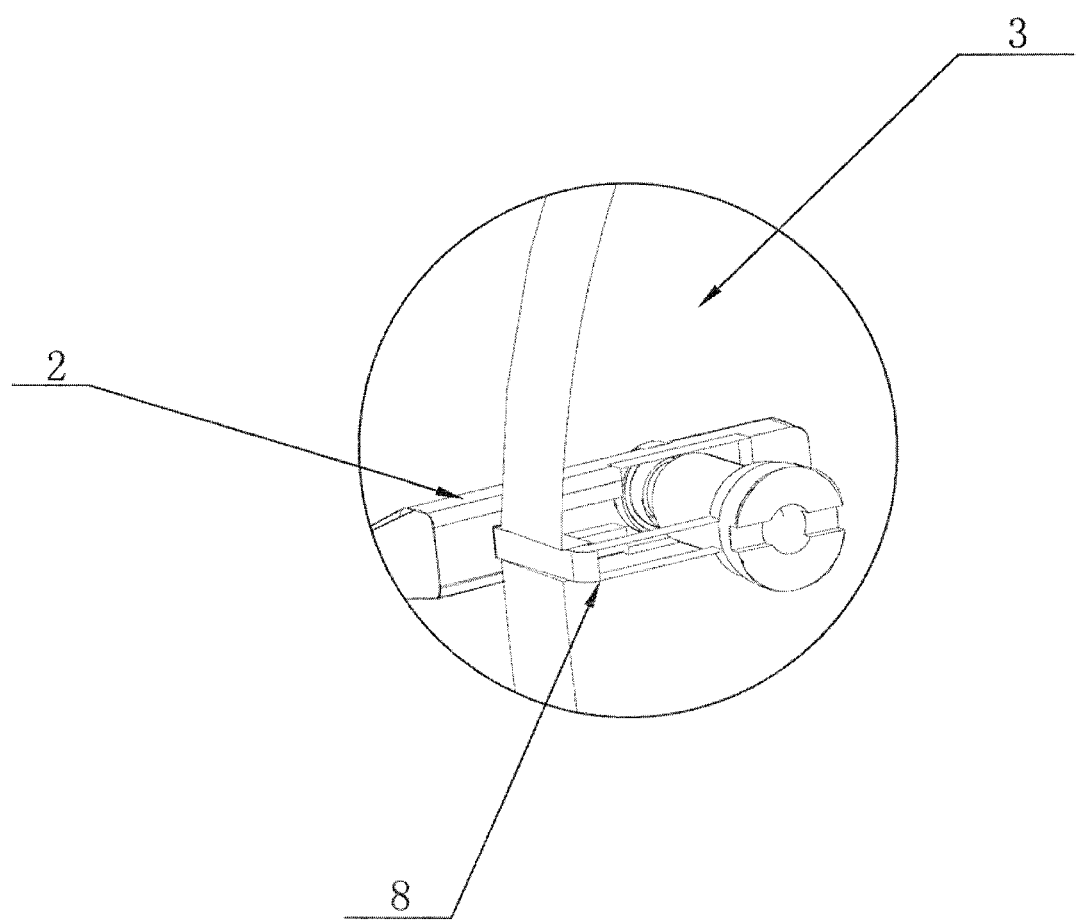
FIG. 2 is a schematic enlarged diagram of part I in FIG. 1.
Figure 3:
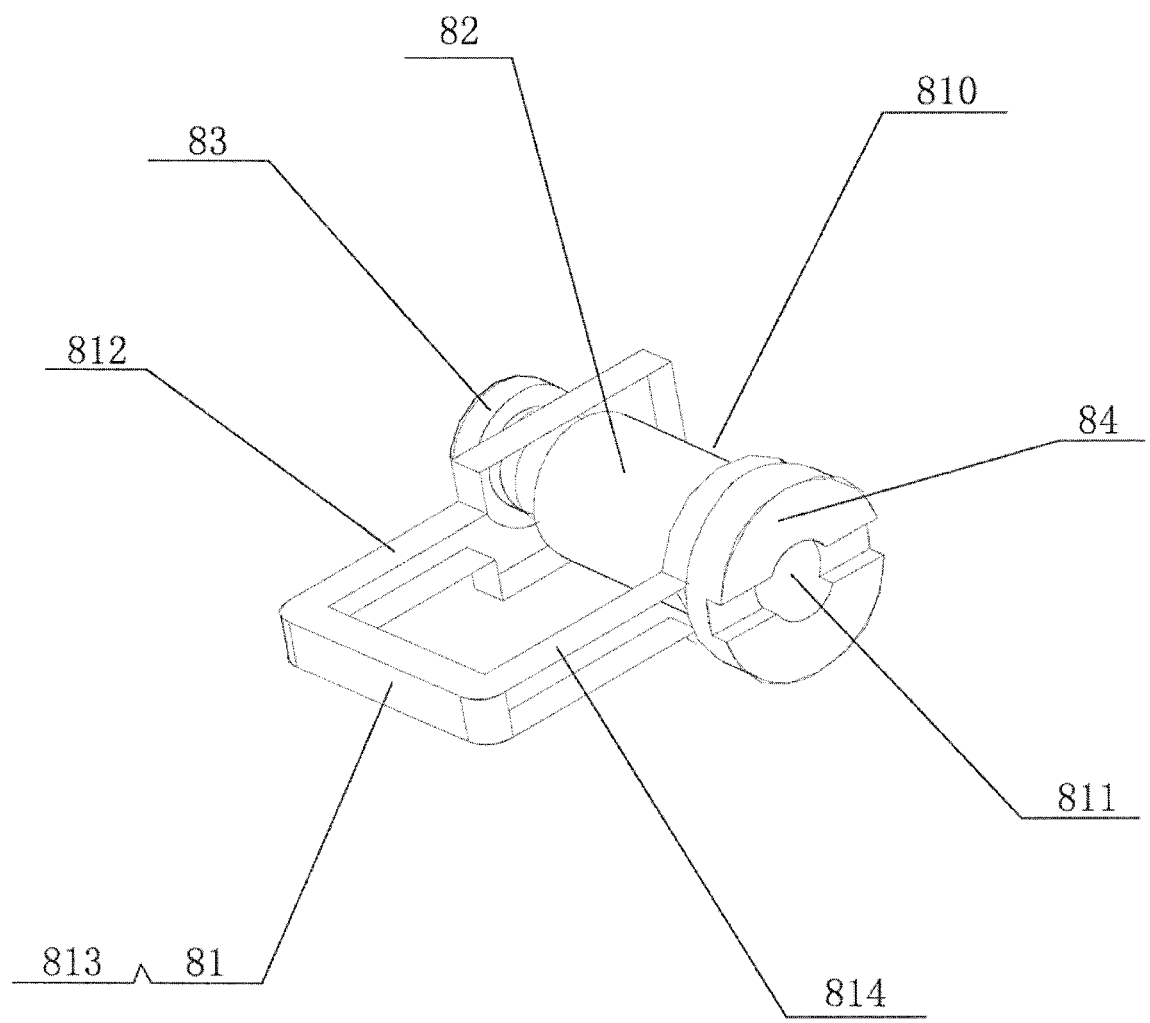
FIG. 3 is a schematic structure diagram of a first lens fixing device according to an embodiment of the present invention.
Figure 4:
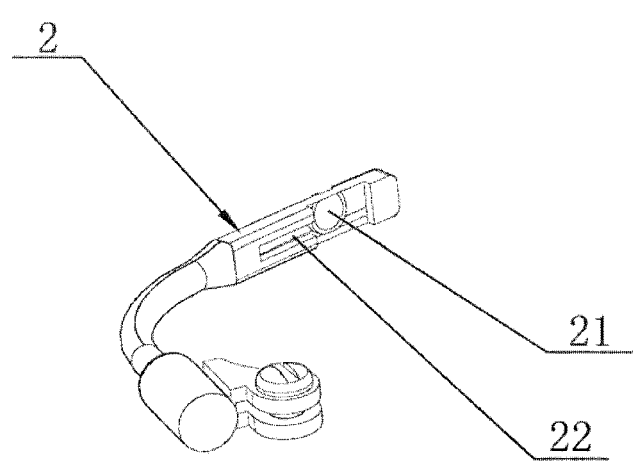
FIG. 4 is a schematic structure diagram of a left end piece according to an embodiment of the present invention.
Figure 5:
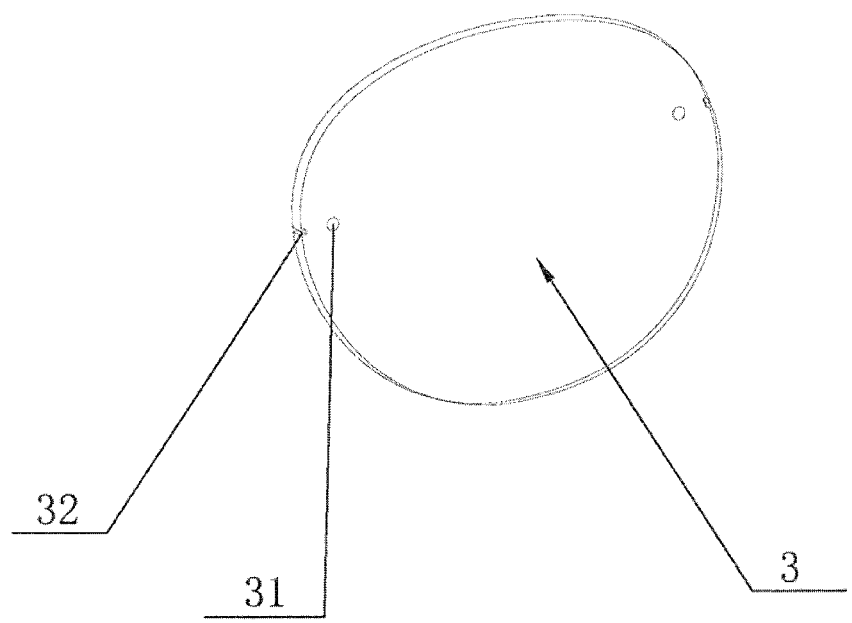
FIG. 5 is a schematic structure diagram of a left lens according to an embodiment of the present invention.

In the description of the embodiment, it should be noted that if the terms "center", "upper", "lower", "left", "right", "vertical", "horizontal", "inner", "outer", "front", "rear" and the like are used, the orientations or positional relationships indicated by the terms are based on the orientations or positional relationships shown in the drawings, are only intended for describing the present invention and simplifying the description, rather than indicating or implying that the indicated means or elements must have specific orientations and be constructed and operated in specific orientations, and thus cannot be construed as limitations to the present invention. In addition, the terms such as "first", "second" and "third" are only intended for the purpose of description and cannot be construed as indicating or implying relative importance.

Referring to FIGS. 1, 2, 3, 4 and 5, novel rimless glasses disclosed in the present invention include a left temple 1, a left end piece 2, a left lens 3, a nose mid-bridge 4, a right lens 5, a right end piece 6, and a right temple 7, where the left temple 1 is connected to a left end of the left lens 3 through the left end piece 2. The left lens 3 is connected to the right lens 5 through the nose mid-bridge 4 and a right end of the right lens 5 is connected to the right temple 7 through the right end piece 6. A first lens fixing device 8 is disposed between the left end piece 2 and the left end of the left lens 3. A second lens fixing device 9 is disposed between a right end of the left lens 3 and a left end of the nose mid-bridge 4. A third lens fixing device 10 is disposed between a right end of the nose mid-bridge 4 and a left end of the right lens 5. A fourth lens fixing device 11 is disposed between the right end of the right lens 5 and the right end piece 6. The first lens fixing device 8 comprises a lens positioning frame 81. A lens slot 810 is disposed at one end of the lens positioning frame 81. A positioning screw tube 82 is disposed through the slotted end of the lens positioning frame 81. A first fixing screw 83 is in threaded connection with a front end of the positioning screw tube 82 and a second fixing screw 84 is disposed at a rear end of the positioning screw tube 82. A first through hole 31 allowing the positioning screw tube to extend therethrough is disposed at the left end of the left lens 3 and the positioning screw tube 82 is disposed through the first through hole 31. A first limiting slot 32 is disposed at a left edge of the left lens 3; the lens positioning frame 81 is sleeved on the left end of the left lens 3 and a left end of the lens positioning frame 81 snaps into the first limiting groove 32. A second through hole 21 is disposed at the left end piece 2. The head of the first fixing screw 83 extends through the second through hole 21 to be in threaded connection with the front end of the positioning screw tube 82; when the first fixing screw 83 is tightened, the left end piece 2 and a front end support of the lens positioning frame 81 are forced to press tightly against a front end face of the left lens 3. A third through hole 811 is disposed at a rear end of the lens positioning frame 81. The head of the second fixing screw 84 extends through the third through hole 811 to be in threaded connection with the rear end of the positioning screw tube 82 and when the second fixing screw 84 is tightened, a rear end support of the lens positioning frame 81 is connected and fixed to a rear end face of the left lens 3.

Preferably, the left end piece 2 is hinged to the left temple 1 through connection with an existing screw. The right end piece 6 is hinged to the right temple 7 through connection with an existing screw. A nose pad support is disposed on the nose mid-bridge 4; and a nose pad is connected to the nose pad support through an existing screw. A threaded center hole is disposed in the positioning screw tube 82. The head of the first fixing screw 83 is in threaded connection with the front end of the threaded center hole, while the head of the second fixing screw 84 is in threaded connection with the rear end of the threaded center hole or the inner wall surface of the center hole in the middle portion of the positioning screw tube 82 is a smooth surface and one of the first fixing screw 83 and the second fixing screw 84 is replaced by a nut, so that the lens positioning frame and the lenses are locked by means of threaded connection of the screw and the nut.

To make the structural arrangement of the present invention more reasonable, preferably, in this embodiment, a positioning groove 22 for mounting the lens positioning frame is disposed at a rear end face of the left end piece 2 and the front end support of the lens positioning frame 81 is mounted in the positioning groove 22 in an embedding manner.

The lens positioning frame 81 includes a front support 812, a middle support 813 and a rear support 814. A rear end face of the front support 812 is perpendicular to a right end face of the middle support 813. A front end face of the rear support 814 is perpendicular to the right end face of the middle support 813 and the front support 812, the middle support 813 and the rear support 814 are integrated.

The front support 812, the middle support 813 and the rear support 814 are made of a metal material or a stainless steel material.

Each of the second lens fixing device 9, the third lens fixing device 10 and the fourth lens fixing device 11 is the same as the first lens fixing device 8 in structure.

The left lens 3 and the right lens 5 are the same in structure.

The left end piece 2 and the right end piece 6 are the same in structure.

A fourth through hole is disposed at each of the left and right ends of the nose bridge 4 and a second positioning groove is disposed at each of the left and right ends of a rear end face of the nose mid-bridge 4. The fourth through hole is configured to allow a fixing screw to extend therethrough and the second positioning groove is configured to position the front support of the aligned lens positioning frame.

Figure 6A:
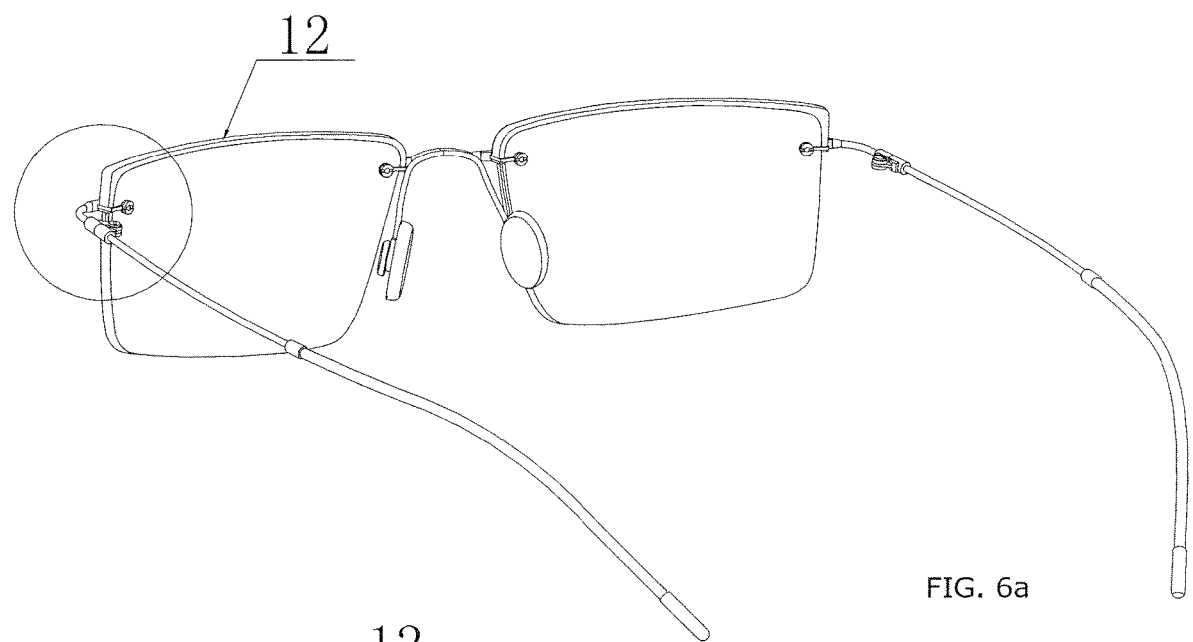
FIG. 6a is a schematic structure diagram according to a further embodiment of the present invention.
Figure 6B:
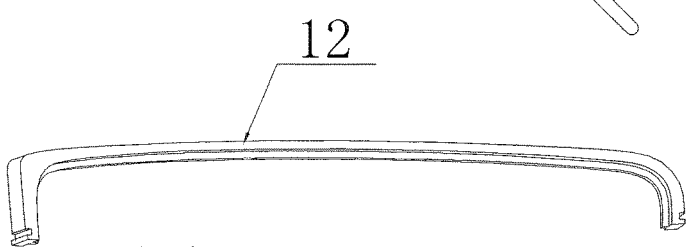
FIG. 6b is a schematic structure diagram of a decorative element.
Figure 6C:
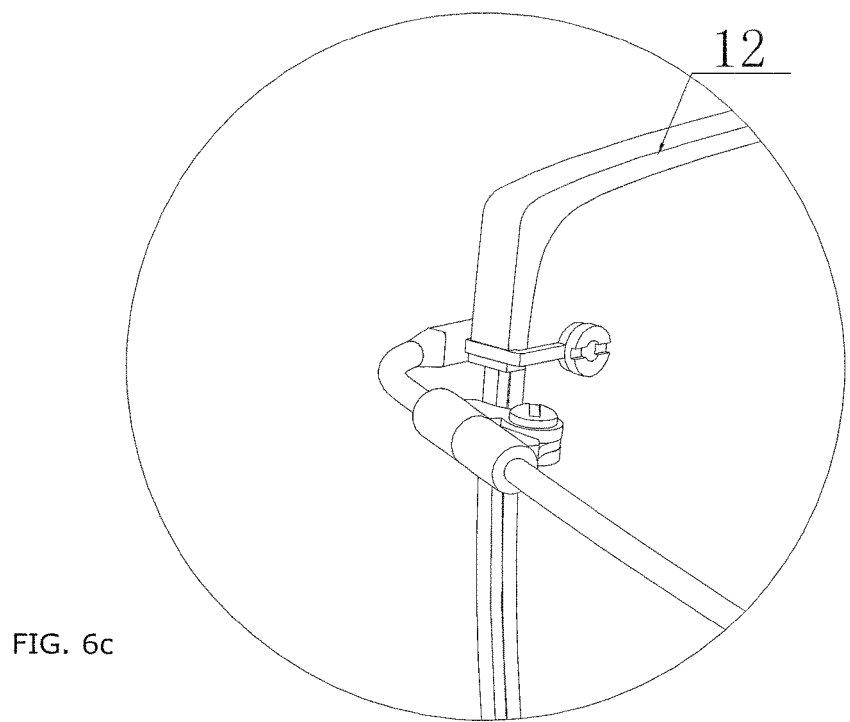

Referring to FIGS. 6a, 6b and 6c an alternative embodiment of the rimless glasses according to the present invention is shown. The rimless glasses further comprise two decorative elements. A decorative element 12 is attached to the left lens by the first lens fixing device 8. The second decorative element is attached to the right lens by the fourth lens fixing device.

In actual use, the first lens fixing device is disposed between the left end piece and the left end of the left lens. The second lens fixing device is disposed between the right end of the left lens and the left end of the nose mid-bridge. The third lens fixing device is disposed between the right end of the nose mid-bridge and the left end of the right lens and the fourth lens fixing device is disposed between the right end of the right lens and the right end piece. The lens positioning frame is sleeved on the lenses and then clamps the lens tightly by locking with screws. The lens positioning frame can disperse the clamping force of the screws, so that the lenses have large-area thrust surfaces and are reliably fixed and not easy to damage. A good lens positioning effect is achieved and reinforcement of the lenses are realized. Moreover, the novel rimless glasses are reasonable in structure design, simple in structure, reliable in lens connection, not easy to loosen, easy to assemble and disassemble, convenient to repair, and good in practicability.

The specific description of the invention according to the above embodiment is only intended for further explanation of the present invention and cannot be construed as limitations to the claimed scope of the present invention. Some non-essential improvements and adjustments made by those skilled in the art to the above contents of the present invention all fall within the claimed scope of the present invention.

What is claimed is:

1. Rimless glasses comprising:
a left temple; a left end piece; a left lens; a nose mid-bridge; a right lens; a right end piece; and a right temple, wherein the left temple is connected to a left end of the left lens through the left end piece, the left lens is connected to the right lens through the nose mid-bridge and a right end of the right lens is connected to the right temple through the right end piece, wherein the rimless glasses further comprises:
a first lens fixing device disposed between the left end piece and the left end of the left lens;
a second lens fixing device disposed between a right end of the left lens and a left end of the nose mid-bridge;
a third lens fixing device disposed between a right end of the nose mid-bridge and a left end of the right lens;
a fourth lens fixing device disposed between the right end of the right lens and the right end piece, the first lens fixing device comprises a lens positioning frame;
a lens slot disposed at one end of the lens positioning frame;
a positioning screw tube disposed through the slotted end of the lens positioning frame;
a first fixing screw in threaded connection with a front end of the positioning screw tube; and
a second fixing screw disposed at a rear end of the positioning screw tube, a first through hole allowing the positioning screw tube to extend therethrough disposed in the left end of the left lens and the positioning screw tube is disposed through the first through hole, a first limiting slot is disposed at a left edge of the left lens, the lens positioning frame is sleeved on the left end of the left lens and a left end of the lens positioning frame snaps into the first limiting groove, a second through hole is disposed in the left end piece, the head of the first fixing screw extends through the second through hole to be in threaded connection with the front end of the positioning screw tube when the first fixing screw is tightened, the left end piece and a front end support of the lens positioning frame are forced to press tightly against a front end face of the left lens; a third through hole is disposed in a rear end of the lens positioning frame, the head of the second fixing screw extends through the third through hole to be in threaded connection with the rear end of the positioning screw tube and when the second fixing screw is tightened, a rear end support of the lens positioning frame is connected and fixed to a rear end face of the left lens, wherein the lens positioning frame comprises:
a front support;
a middle support; and
a rear support, wherein a rear end face of the front support is perpendicular to a right end face of the middle support, a front end face of the rear support is perpendicular to the right end face of the middle support and the front support, the middle support and the rear support are integrated, wherein the front support, the middle support and the rear support are made of a stainless steel material.

2. The rimless glasses according to claim 1, further comprising a positioning groove for mounting the lens positioning frame disposed in a rear end face of the left end piece and the front end support of the lens positioning frame is mounted in the positioning groove in an embedding manner.

3. The rimless glasses according to claim 1, wherein the first lens fixing device, the second lens fixing device, the third lens fixing device and the fourth lens fixing device are structurally alike.

4. The rimless glasses according to claim 1, wherein the left lens and the right lens are the same in structure.

5. The rimless glasses according to claim 1, wherein the left end piece and the right end piece are structurally alike.

6. The rimless glasses according to claim 1, wherein a fourth through hole is disposed at each of the left and right ends of the nose mid-bridge and a second positioning groove is disposed at each of the left and right ends of a rear end face of the nose mid-bridge.

7. The rimless glasses according to claim 1, further comprising at least one decorative element, wherein at least one decorative element is attached to the left lens by the first lens fixing device.

\* \* \* \* \*